May 29, 1956   M. H. SPIELMAN   2,748,301
ELECTRIC MOTOR BRUSH HOLDER AND FRAME ADAPTED THERETO
Filed July 21, 1953
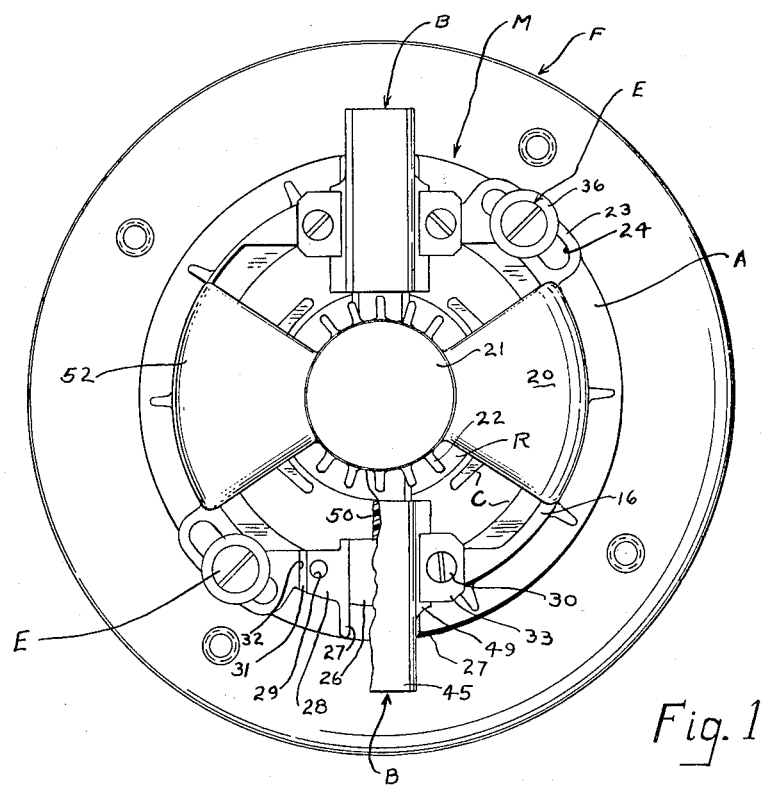
Fig. 1
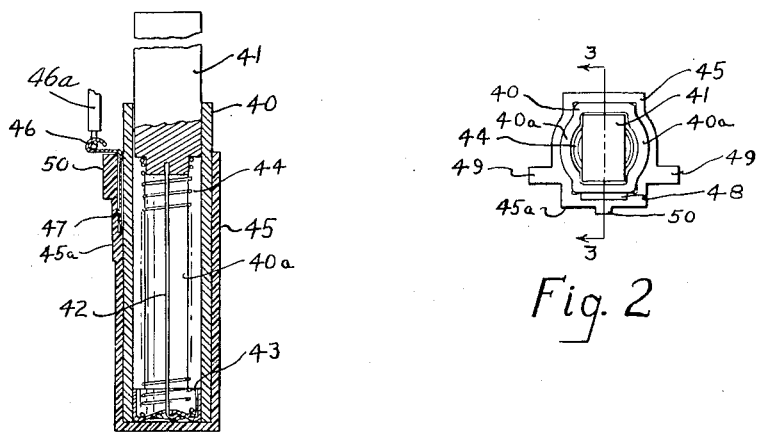
Fig. 3
Fig. 2
INVENTOR.
MILTON H. SPIELMAN
BY Albert R. Golrick
Attorney

United States Patent Office 2,748,301
Patented May 29, 1956

2,748,301

ELECTRIC MOTOR BRUSH HOLDER AND FRAME ADAPTED THERETO

Milton H. Spielman, Cuyahoga Falls, Ohio, assignor, by mesne assignments, to The Lamb Electric Company, Kent, Ohio, a corporation of Delaware Application July 21, 1953, Serial No. 369,362

7 Claims. (Cl. 310—241)

The present invention relates to improvements in commutator type electric motors and, more particularly, to improvements in the brush holders and motor frame member adapted thereto for fractional horse power motors.

Fractional horse power motors of the commutator type are manufactured in great number for a wide variety of applications, particularly for various household appliances such, for example, as vacuum cleaners and electric fans. This invention is directed to the provision of a novel brush holder unit and a motor frame member adapted to receive such unit which facilitate the manufacture of such motors by low cost mass production methods and, further, provide a brush holder structure easy to maintain.

The brush holder itself comprises the usual brush compression spring and brush with attached flexible pig tail conductor, which are held together as a sub-assembly by an anchor member to which the end of the pig tail is attached, the spring being interposed and retained between the brush and anchor member with the conductor passed through the length of the spring; a metal brush guide tube into which the said sub-assembly is inserted and held by the anchor element; and a molded insulating tube into which the guide tube containing the brush may be slip-fitted. A brush lead connector clip is provided which serves not only for a simple connection of a brush lead to the brush holder unit, but also as means for locking the guide and insulating tubes in proper assembled relation to each other. The brush holder disclosed herein furnishes not only the necessary insulation and mounting elements, but also has the advantage of avoiding the usual procedure of molding the insulating tube about the guide tube. The motor end frame member has a slot structure for seating the holder unit in exact position and includes a simple means for clamping the holder in such position. Further, the holder unit and frame seat therefor are mutually adapted for an engagement whereby the holder unit is self-holding upon insertion in the frame seat, so that there is no need to jig or manually hold the unit in position during the further assembly operation of clamping the unit on the frame, nor is there any need for subsequent radial adjustment of the holder unit position. Moreover, since the insulating tube may be molded with finished gauging surfaces adapted to locate the unit in the seat, machining of the frame member is accordingly reduced from what is necessary by common practice.

An object, then, of the present invention is the provision of a brush holder structure adapted for nearly complete sub-assembly as a unit to be applied to a motor frame adapted to receive the same. Another object is the provision of a relatively simple brush holder structure and of a frame structure whereby the brush holder is quickly and exactly assembled to the motor frame. Other objects and advantages of the invention will appear from the following description and the drawings wherein:

Fig. 1 is an end elvational view of a motor and fan unit incorporating the brush carrying motor end frame member and brush holder unit of this invention, certain portions being broken away to show details of the structure more clearly;

Fig. 2 is an enlarged detailed end view of the brush holder unit viewed from the inner or commutator end thereof; and Fig. 3 is a longitudinal sectional view taken along the line 3—3 in Fig. 2.

An electric motor and fan unit incorporating this invention is shown in the drawings, wherein the motor and fan housing assemblies are designated by the general reference characters M, F respectively and comprises as principal elements the generally cylindrical stator or field core C; the armature R; and the motor frame end member A carrying brush holder units B and a second frame end member within the fan housing, which are held on opposite ends of the field core C by bolts E and in which the rotor shaft is journalled by suitable bearings.

The field core structure may be that described in United States Patent No. 2,631,251 issued March 10, 1953, while the general motor frame organization is that of co-pending Cole application Serial No. 369,369, now United States Patent Number 2,713,455. For clarity in the drawings, the two field coil windings are omitted. The end edges of the field core are formed by turning or otherwise with cylindrical surfaces and end surfaces to provide suitable end diameter and effective core length whereby the end member A and a second frame end member may be fitted onto the core ends and maintained in exact relation.

The frame member A and also the opposite end frame member are adapted to die casting production. The member A comprises an annular body portion 16 with inner rim machined or otherwise rabbeted to provide an inner peripheral surface and end face surface fitting the corresponding cylindrical and end surfaces on the edge of the field core and allowing manual rotational adjustment of A; a diametrically disposed bridge or spider portion 20 including at the center thereof an armature bearing socket structure 21 with external integral bearing cooling fins 22 for the bearing at the commutator end of the shaft; diametrically disposed lug formations 23 projecting externally from the annular body portion and arcuately slotted at 24 to receive the motor frame bolts E; and diametrically opposed radially directed brush seating slots 26 formed in the outer end faces of the sectorially thickened walls of the annular body 16 with the slot walls extended outwardly by rib formations 27.

At the sides of the brush slot the adjacent surfaces 28 are provided with threaded apertures 29 spaced from the slot for receiving brush clamping screws 30 and outwardly of each aperture a double shoulder providing edge supporting and edge locating surfaces 31 and 32 for the perforated spring metal brush holder clips or clamping plates 33, which immediately engage longitudinal fins 49 on opposite sides of each holder for clamping against surface 28. The holder clamp plates 33, approximately rectangular in shape and somewhat longer than the radial extent of the surface 31, are preformed to downwardly concave shape with ends more sharply turned so that the end edges thereof dig into the brush holders and provide mechanical as well as frictional clamping purchase thereon. The resiliency and shape of plates 33 introduce the function of, and hence obviate the need of, lock washers. The brush seating slots 26 may be cast slightly under width and thereafter sized by a light broaching cut.

The second frame member at the other end of the motor of course may be of any form adapted to engage the opposite end of the field core, provide a journal for the opposite end of the armature shaft, and receive and be engaged by the bolts E in clamping relation. However, in a fan-motor unit as shown, this second frame end member preferably includes integral mounting means for fan housing elements, has rabbeted formations engaging outer cylindrical surface and end face portions of the core, threaded apertures for bolts E, and carries means cooperating with a formation on the core to guide and locate the core in standard orientation relative to the bolt apertures during assembly and to maintain the orientation during rotational positioning of member A for brush adjustment.

Thus the motor frame is constituted of the field core C itself, the frame end member A and the aforementioned second frame end member, and the clamping bolts E, extended through washers 36 and the brush adjustment slots 24 in member A and threaded into the second end member. The slot arrangement and the corresponding machine surfaces on member A and on the field core C permit setting of the brushes relative to the field core for adjustment of motor speed output and thus the fan efficiency by merely loosening bolts E and rotationally adjusting member A.

The brush holder units B, as may be best seen in Figs. 2 and 3, each comprise an extruded metal brush tube 40; a brush element 41, preferably with an end pre-shaped for the commutator, the brush being of rectangular cross section and connected at its outer end by a flexible conductor 42 to an anchor element 43; a brush compression spring 44, through which conductor 72 extends, interposed between brush and anchor element to urge the brush into contact with the commutator; a closed end insulating tube 45 adapted in cross section to receive the tube 40 telescoped in close slip fit; and a brush lead connecting clip 46—omitted in Fig. 2—soldered to the brush lead 46a, which is pressed endwise between insulating and metal tubes. The brush and other leads are omitted in Fig. 1, the relation of brush lead and holder unit appearing from Fig. 3. The body of clip 46 is slightly bowed lengthwise for wedging action between tubes 40 and 45 and nibbed outwardly of the convex surface at 47 to provide a barb with free end directed toward the open end of the insulation tube, which barb bites into the insulating tube, to prevent loosening and displacement of the several elements. A slight recess 48 in the bottom wall of the insulating tube 45 provides space for the insertion of the clip member and a shoulder at the inner end of the recess limits the insertion thereof. The tube 45 is preferably formed or molded of a plastic such as nylon, with an integral longitudinally extended lateral clamping fins 49. The fins 49 are spaced upwardly from the bottom side of the insulating tube a distance corresponding to the depth of the brush holder slot for clamping between clips or parts 33 of the holder clamping means and surfaces 28, while allowing the holder body, that is the flat 45a of tube 45, to nearly bottom on the flat of slot 26. A central lug 50 at the inner end of the bottom brush wall projecting perpendicularly to the guide tube length provides a gauging shoulder bearing outwardly against an abutment shoulder or surface provided by the inner edge of the seat slot 26 for positioning or locating the brush assembly radially in the slot.

Tube 40 is modified from the rectangular cross section corresponding to the brush cross section by the curved portions 40a in the long sides of the section which accommodate and maintain the brush spring 44 in roughly cylindrical disposition while yet providing means maintaining the brush against rotation relative to the commutator. To aid in maintaining the spring position, and to receive solder for securing conductor 42, the face of the anchor member 43 is dished concavely inwardly toward the spring, providing a slight projection centering one end of the spring, while the inner end of the brush is turned down to fit in the other spring end. The flexible conductor may be held in an end bore of the brush by a solder plug or other usual means and at the other by soldering to the anchor element.

The anchor member 43 itself may be cup shaped, as shown, and pressed into the outer end of the brush tube between the curved wall portions 40a, or it may be an outwardly concave disk set into a slight counterbore in tube 40 with the edges of the bore peened over to have purchase on the disk edge. In either form, the anchor member is centrally apertured so that in assembling the brush with attached conductor, the brush spring and anchor into a sub-assembly unit, the conductor is simply threaded through the spring and through the anchor aperture to required length and soldered in the concavity in the outer face of the anchor to secure the conductor thereto. The resulting unit is slid into the tube 40, the anchor is seated in the tube end, either by pressing or peening and the tube 40 is slid into the insulator tube 45. The travel of the brush is limited by the conductor length so that the brush is retained within the tube in all subsequent operations.

For final assembly of each brush holder into the motor frame the other elements of which have been assembled, the lead clip 46, previously soldered to a corresponding brush lead, is pressed inwardly between the insulating tube 45 and conductor tube 40 to wedge and lock the elements together. The holder unit is then seated in its proper slot 26 by sliding it inward until the lug 50 drops over the inner edge of the slot. Despite the inward displacement of the brush into the holrer unit upon encountering the armature commutator already in the motor frame with attendant compression of spring 44, the engagement of lug 50 with the inner end of the slot retains the holder unit in place in frame member A, so that the plates 33 and screws 30 may be applied without need for manual or jig holding of the unit B and member A.

I claim:

1. In a commutating motor, the combination of brush holder units and mounting means on the motor frame adapted to receive and secure the holder units in proper mutual relation to each other and to the commutator; each said brush holder unit comprising a brush element, a metal brush guide tube adapted to receive said brush element with an end projecting from one end of the guide tube toward the commutator, an anchor element secured at the other end of said metal tube, a brush compression spring interposed between said brush and said anchor element biasing said brush element outwardly from said guide tube, a flexible conductor having one end secured to the inner end of said brush element and the other end to said anchor element for retaining a portion of the brush element within said guide tube, an insulation tube receiving therein said guide tube and having formed thereon stop means for endwise positioning of the said guide tube, said insulation tube having near the brush end thereof a projection extending perpendicularly to the direction of the guide tube length and oppositely disposed longitudinally extended lateral fins thereon, said insulation tube also having a shallow recess in the inner surface thereof extended longitudinally inward from the commutator end thereof, and a brush lead connector adapted in size and shape for insertion into said recess in wedging contact betwen said metal tube and said insulation tube and having an outer end projecting from said recess providing an area for a brush lead soldered thereto; and said mounting means comprising a motor frame end member at the commutator end of said motor having for each brush holder unit a seat formation and a perforated holder clamping plate at each side of the seat formation, each plate having an edge bearing on the top of a corresponding said fin and an opposite edge suported by the seat formation, a clamping screw through each perforated plate threaded into the frame end member, each said seat formation including a slot formation directed toward the commutator adapted to embrace a portion of the length and of the periphery of said insulating tube and to engage said projection against movement outwardly relative to said commutator, and a frame portion extending laterally from each side of said slot for supporting the bottom of a corresponding fin and having a threaded aperture at each side of and spaced from said slot for each said clamping screw, said frame portion also having a shoulder formation extended parallel to the slot and spaced outward of each said aperture providing a surface supporting said opposite plate edge, whereby each said brush holder unit is secured in said seat formations.

2. In a commutating motor, the combination of brush holder units and mounting means on the motor frame adapted to receive and secure the holder units in proper mutual relation to each other, to the frame and to the commutator; each said brush holder unit comprising a brush element, a metal brush guide tube adapted to receive said brush element in one end thereof, an anchor element secured at the other end of said guide tube, a brush compression spring interposed between said brush and said anchor element biasing said brush element outwardly from said guide tube, a flexible conductor extended through said brush spring having one end secured to the inner end of said brush element and the other end to said anchor element and being of such length as to retain an inner end portion of the brush length within said guide tube, an insulation tube receiving said guide tube and having at one end a shouldered stop for the anchor element end of the guide tube, said insulation tube having near the other end thereof a projection extending perpendicularly to the direction of the guide tube length and having oppositely disposed longitudinally extended lateral fins, said insulation tube also having a shallow recess in the inner surface thereof extended longitudinally inward from the open end thereof, and a brush lead connector adapted in size and shape for insertion into said recess in wedging contact between said guide tube and said insulation tube and having an outer end projecting from said recess providing an area for a brush lead soldered thereto; and said mounting means comprising a motor frame end member on the commutator end of said motor having for each brush holder unit a seat formation and a resilient perforated holder clamping plate at each side of the seat formation, each plate having an edge bearing on the top of a corresponding said fin and an opposite edge supported by the seat formation, a clamping screw through each perforated plate threaded into the frame end member, each said seat formation including a slot formation directed toward the commutator adapted to embrace a portion of the length and of the periphery of said insulating tube and to engage said projection against movement outwardly relative to said commutator, a frame portion extending laterally from each side of said slot for supporting the bottom of a corresponding fin having a threaded aperture at each side of and spaced from said slot for each said clamping screw, said frame portion also including a double shoulder formation extended parallel to the slot and spaced outward of each said aperture providing a first surface supporting said opposite plate edge and perpendicular thereto a second surface gauging the plate position endwise, whereby each said brush holder unit is secured in said seat formations.

3. In an electric motor brush holder unit adapted to be mounted to a motor frame end member and including a metal brush guide tube and an insulation tube about the guide tube: means for securing a brush lead in electrical contact to the guide tube comprising a lead connector of resilient metal strip preformed to have a body portion bowed lengthwise and an end portion for attachment of a lead, a barb nibbed out of the body portion toward its convex side with the free end of the barb directed toward said end portion, and guide and insulation tube structures providing therebetween an opening extended longitudinally inward from an end of said insulation tube for endwise insertion of the body portion of said connector, the opening dimension between said tubes being less than the preformed bow height of said body portion and the convex side and barb of the body portion being disposed against the insulation tube.

4. A brush holder unit for a commutating motor having a motor frame adapted to mount the holder, comprising a metal brush guide tube, a brush element slidably telescoped into said guide tube with an end projecting from one end of the tube, an anchor element secured at the other end of said guide tube, a brush compression spring interposed between said anchor element and said brush element biasing said brush element outwardly from said guide tube, a flexible conductor having opposite ends secured to said brush element and to said anchor element retaining a portion of the brush within the guide tube, an insulation tube having one end open and an internal cross section adapted to receive the said guide tube in slip-fitting telescoped relation and having the other end closed as a stop formation adapted to engage the anchor end of said guide tube, said insulation tube having in the inner surface thereof a shallow recess extending longitudinally inward from the open end thereof, and an elongated metal brush lead connector preformed to a slightly longitudinally bowed shape with a barb on the convex bow side and adapted in size for endwise insertion into said recess in wedging contact between said insulation and guide tubes with the barbed convex side against said insulation tube and having an outer end projecting from said recess providing a free area for a brush lead secured thereto, the free end of the barb being directed toward the open end of the insulation tube, whereby said connector serves to lock said tubes against mutual displacement.

5. In a commutating motor, the combination of brush holder units and mounting means on the motor frame adapted to receive and secure the holder units in proper mutual relation to each other and to the commutator of the motor; each said brush holder unit comprising a brush element, a metal brush guide tube receiving the brush element with an end projecting from one end of the tube toward the commutator, means biasing said brush element outwardly from said guide tube, means for electrically connecting the brush element to the guide tube, and an insulation tube receiving the guide tube therein and having a laterally extending abutment shoulder formation facing outwardly away from the commutator; said mounting means comprising a motor frame end member at the commutator end of said motor having for each holder unit a seat formation including a slot with length directed radially of the commutator adapted to embrace a portion of the periphery and length of the insulation tube and shaped to provide an abutment edge against which the abutment shoulder of the insulation tube abuts for positioning radially the holder unit in said slot during assembly before the unit is secured in said slot, and holder unit securing means attached to the frame member adapted to clamp the insulation tube of the holder unit in the slot of the motor frame member.

6. In a commutating motor, the combination of brush holder units and mounting means on the motor frame adapted to receive and secure the holder units in proper mutual relation to each other and to the commutator, said mounting means comprising a motor frame end member having for each holder unit a seat formation and holder unit clamping means secured on each side of the seat formation; each said brush holder unit comprising a metal brush guide tube, a brush element slidably telescoped into said guide tube and projecting from one end of the guide tube toward the commutator, an anchor element secured on the other end of said guide tube, a brush compression spring interposed between said brush and anchor element biasing said brush element outwardly from said guide tube, a flexible conductor having opposite ends secured to said brush element and to said anchor element for retaining a portion of the brush element within the guide tube, an insulation tube with said guide tube telescoped therein and having formed thereon stop means for endwise positioning of the said guide tube, said insulation tube having an integral outward projection extending perpendicularly to the direction of the guide tube length, said insulation tube also having a shallow recess in the inner surface thereof extended longitudinally inward from the commutator end thereof, and a conductive brush lead connector inserted into said recess in wedging contact between said metal tube and said insulation tube and having a brush lead attaching outer end area projecting from said recess; said seat formation including a slot directed radially toward the commutator open toward one end of the motor and adapted to receive and engage a portion of the length and of the periphery of an insulation tube, a formation associated with the slot providing an abutment surface engaging said integral projection of a corresponding insulation tube as a holder unit positioning means, and a pair of shoulder formations respectively laterally spaced from and extending parallel to said slot on each side thereof; said holder unit clamping means including a perforated portion on each side of the slot and bearing partly on the insulation tube and partly on a corresponding shoulder formation and a clamping screw through each perforated portion threaded into said frame member.

7. In a commutating motor, the combination of brush holder units and mounting means at the commutator end of the motor frame adapted to receive and secure the holder units in proper mutual relation to each other and to the commutator, said mounting means comprising a motor frame end member having for each holder unit a seat formation and holder unit clamping means secured on each side of the seat formation; each said brush holder unit comprising a metal brush guide tube, a brush element slidably telescoped in said guide tube and projecting from one end of the guide tube toward the commutator, an anchor element secured on the other end of said guide tube, a brush compression spring interposed between said brush and anchor element biasing said brush element outwardly from said guide tube, a flexible conductor having opposite ends secured to said brush element and to said anchor element for retaining a portion of the brush element within said guide tube, an insulation tube with said guide tube telescoped therein and having formed thereon stop means for endwise positioning of the said guide tube, said insulation tube having an integral outward projection extending perpendicularly to the direction of the guide tube length and oppositely disposed longitudinally extended lateral fins thereon, said insulation tube also having a shallow recess in the inner surface thereof extended longitudinally inward from the commutator end thereof, and a conductive brush lead connector inserted into said recess in wedging contact between said metal tube and said insulation tube and having a brush lead attaching outer end area projecting from said recess; said seat formation including a slot directed radially toward the commutator open toward one end of the motor and adapted to receive and engage a portion of the length and of the periphery of a unit guide tube, a formation associated with the slot providing an abutment surface engaging said integral projection of a corresponding said insulation tube as a holder unit positioning means, and a pair of shoulder formations respectively laterally spaced from and extending parallel to said slot on each side thereof; said holder unit clamping means including a perforated part on each side of the slot bearing partly on a corresponding fin of the insulation tube and partly on a corresponding shoulder formation and a clamping screw through each perforated part threaded into said frame member.

References Cited in the file of this patent

UNITED STATES PATENTS

| | | |
|---|---|---|
| 1,342,583 | Borger | June 8, 1920 |
| 1,970,604 | Henry | Aug. 21, 1934 |
| 2,211,006 | Doughman | Aug. 13, 1940 |
| 2,349,401 | Beckwith | May 23, 1944 |
| 2,516,608 | Wightman | July 25, 1950 |
| 2,537,714 | Spielman | Jan. 9, 1951 |

FOREIGN PATENTS

| | | |
|---|---|---|
| 141,892 | Great Britain | Apr. 29, 1920 |
| 314,806 | Great Britain | June 29, 1929 |
| 549,343 | France | Nov. 16, 1922 |
| 617,387 | Great Britain | Feb. 4, 1949 |
| 330,170 | Germany | Dec. 10, 1920 |